US008108780B2

(12) United States Patent
Abernethy et al.

(10) Patent No.: US 8,108,780 B2
(45) Date of Patent: Jan. 31, 2012

(54) COLLABORATION WIDGETS WITH USER-MODAL VOTING PREFERENCE

(75) Inventors: Michael N. Abernethy, Pflugerville, TX (US); Christopher S. Alkov, Austin, TX (US); Travis M. Grigsby, Austin, TX (US); Nazgol Sedghi, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 928 days.

(21) Appl. No.: 12/103,773

(22) Filed: Apr. 16, 2008

(65) Prior Publication Data

US 2009/0265640 A1  Oct. 22, 2009

(51) Int. Cl.
*G06F 3/00* (2006.01)
(52) U.S. Cl. .......................................... 715/751; 705/12
(58) Field of Classification Search .................. 715/751
See application file for complete search history.

(56) References Cited

U.S. PATENT DOCUMENTS

| | | | |
|---|---|---|---|
| 5,999,948 A | 12/1999 | Nelson et al. | |
| 6,208,340 B1 | 3/2001 | Amin et al. | |
| 6,311,190 B1 * | 10/2001 | Bayer et al. | 1/1 |
| 6,918,092 B2 | 7/2005 | Talley et al. | |
| 6,952,678 B2 * | 10/2005 | Williams et al. | 705/320 |
| 7,159,178 B2 * | 1/2007 | Vogt et al. | 715/733 |
| 7,270,269 B2 * | 9/2007 | Iyer et al. | 235/386 |
| 7,640,181 B2 * | 12/2009 | McClure et al. | 705/12 |
| 7,835,689 B2 * | 11/2010 | Goldberg et al. | 455/3.06 |
| 2003/0154124 A1 * | 8/2003 | Neff | 705/12 |
| 2003/0164859 A1 | 9/2003 | Evans | |
| 2005/0216332 A1 * | 9/2005 | Lewin | 705/12 |
| 2006/0015846 A1 | 1/2006 | Fraleigh et al. | |
| 2006/0101328 A1 | 5/2006 | Albornoz et al. | |
| 2006/0130120 A1 | 6/2006 | Brandyberry et al. | |
| 2007/0023515 A1 * | 2/2007 | Urken | 235/386 |
| 2007/0078953 A1 | 4/2007 | Chai et al. | |
| 2007/0083423 A1 * | 4/2007 | Delbridge | 705/12 |
| 2007/0088729 A1 | 4/2007 | Baca et al. | |
| 2007/0118813 A1 | 5/2007 | Forstall et al. | |
| 2008/0021777 A1 * | 1/2008 | Mack et al. | 705/14 |
| 2008/0103880 A1 * | 5/2008 | Saaty | 705/12 |
| 2008/0250331 A1 * | 10/2008 | Tulshibagwale | 715/751 |
| 2009/0138343 A1 * | 5/2009 | Knowles et al. | 705/12 |
| 2010/0179991 A1 * | 7/2010 | Lorch et al. | 709/206 |

OTHER PUBLICATIONS

Richard T. Simon, Mary Ellen Zurko, Separation of Duty in Role-Based Environments, 1997, IEEE, p. 183-194.*
Ryall, et al., "iDwidgets: Parameterizing Widgets by User Identity", Interact 2005 Tenth IFIP TC13 International Conference on Human-Computer Interaction.

* cited by examiner

*Primary Examiner* — Ashraf Zahr
(74) *Attorney, Agent, or Firm* — Mitch Harris, Atty at Law, LLC; Andrew M. Harris; Jill A. Poimboeuf

(57) ABSTRACT

Collaborative voting widgets (or controls) provide a graphical user interface (GUI) that is adapted for collaborative effort between groups of individuals. The widgets have a modal selection state that changes the appearance and functionality of the widget depending on whether the widget is being presented to a particular user (e.g., a group leader) or a member of the group. The group provides user input to vote on a value of the widget. The particular user may subsequently override the voting result, reset the votes and optionally call for a re-vote, overriding the group consensus or breaking ties.

17 Claims, 4 Drawing Sheets

COLLABORATION WIDGETS WITH USER-MODAL VOTING PREFERENCE

BACKGROUND OF THE INVENTION

1. Field of the Invention

The present invention is related to user-interface design software, and more particularly to a graphical user interface that includes collaboration widgets with a user-modal voting preference.

2. Description of Related Art

Graphical user interfaces (GUIs), for collaboration are finding increasing use as traditional user interfaces are adapted for collaboration between multiple participants. Collaborative software tools have, been widely employed in document editing and proofing, as well as more recently for collaborative authorship. More recently, collaborative tools have been employed in the design of GUIs, for example in community-directed portals where multiple users in a given community maintain the look and feel, as well as the information provided by their portal. However, the tools for maintaining such GUIs typically provide the same interface widgets (also referred to as GUI controls) to each user having authority to alter the GUI, and changes made by an individual authorized editor are reflected in the resultant GUI.

Collaborative software in general may be directed toward any collaborative task, not necessarily generation of output such as documents or software. Survey programs provide an example of a simple, collaborative effort in which the result is survey data. GUIs for surveys are now ubiquitous on websites and provide widgets/controls for the input of opinion data. However, such survey controls typically expect an anonymous user and merely collect data from each instance in the same manner while providing the same functionality and appearance to each user.

More recently, widgets have been proposed that would provide functionality for supporting voting operations within a particular group of collaborating, users. Such widgets can identify the user of the widget, and therefore can provide a single vote per user, for example. The appearance of the widgets may also be tailored to the individual user, providing a custom control. However, there are circumstances in which a leader of a collaborative effort may need to change, override or provide decisive input to a collaborative choice.

It would therefore be desirable to provide improved controls that facilitate the GUI design process in collaborative efforts.

BRIEF SUMMARY OF THE INVENTION

Various embodiments of the invention are embodied in a computer-performed method, computer program product and a computer system that provides one or more widgets or controls for a graphical user interface (GUI).

The widgets distinguish between a group of users and a particular user having leadership privileges. The functionality and appearance of the widgets is altered in accordance with whether the user is an ordinary member of a group or a group leader. Voting input is received by the widgets from at least a portion of the group of members and optionally the group leader. The result of the voting is modified in accordance with further input from the group leader, which may be in response to detection of a tie to be resolvedly the further input, or merely a veto/override cast by the group leader. The group leader may also reset the voting values and optionally call for a revote.

The foregoing and other objectives, features, and advantages of the invention will be apparent from the following, more particular, description of the preferred embodiment of the invention, as illustrated in the accompanying drawings.

BRIEF DESCRIPTION OF THE SEVERAL VIEWS OF THE DRAWING

The novel features believed characteristic of the invention are set forth in the appended claims. The invention itself, however, as well as a preferred mode of use, further objectives, and advantages thereof, will best be understood by reference to the following detailed description of the invention when read in conjunction with the accompanying Figures, wherein like reference numerals indicate like components, and:

DETAILED DESCRIPTION OF THE INVENTION

The present invention relates to graphical user interface (GUI) widget objects or controls, and specifically those that provide for collaboration by voting among members of a group. Widget objects are generally used to refer to control objects, provided on a web page from one or more servers, but in the context of the present invention, collaboration widgets are understood to include any user interface control for which interaction from multiple members of a group that each generate instances of the widget, in order to set one or more control values of the widget. The widgets of the present invention are voting widgets for allowing multiple users to collaborate on choices of some type by setting controls in a graphical user interface, for example, the illustrated embodiment described below, and illustrated in the Figures provides selection of objects for implementing a webpage that the multiple users are collaboratively designing. The widgets maybe displayed in a browser that is pointed to a particular uniform resource locator (URL) that is provided in support of the voting process. The widgets may also be used in surveys, document authoring and, any other process where input from users according to a majoritarian or quasi-majoritarian process is employed to arrive at a final product design or other result of a decision process. The decision on final widget control values may be made based on pure majority selection, or a plurality voting process may be implemented in which the most-favored value(s) is/are selected as the final value(s).

The widgets of the present invention provide special features that are enabled when the widget-instantiating user is determined to be a group leader, as determined from a user ID or other suitable qualification. The group leader is provided additional information regarding the current voting status of the widget, and special control of the value of the widget that alters the current voting status, including the ability to reset the votes, break ties, call for a re-vote which signals other group members that the control needs to be re-voted, and over-ride the voting result. The present invention is not limited to a particular mode of member control, and the voting input may be received during simultaneous sessions, or received during arbitrarily sequential or simultaneous sessions. The group leader may also be restricted from participating in the voting process itself (other than the reset and override abilities mentioned above), or may participate only to break a "tie" in the voting.

Figure 1:
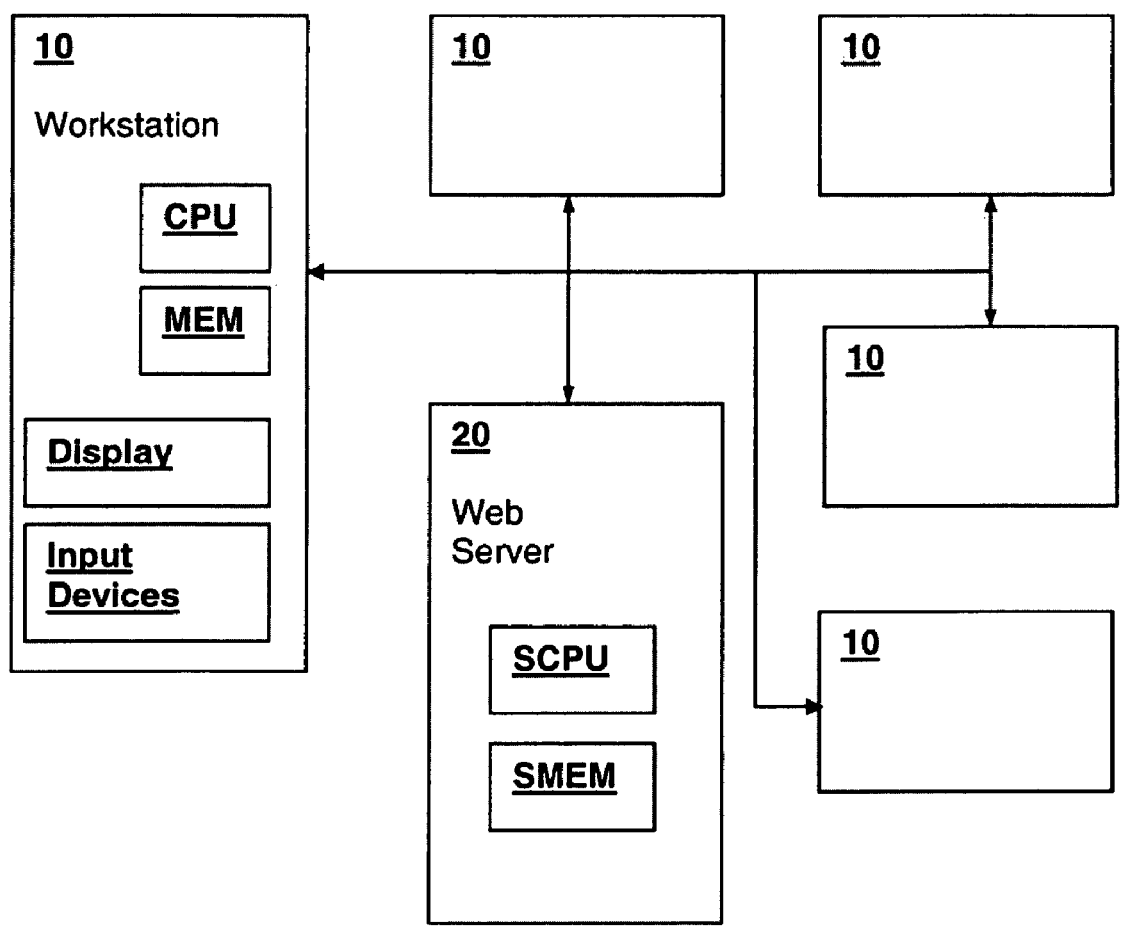
FIG. 1 is a block diagram illustrating a networked computer system in which techniques according to an embodiment of the present invention are practiced.

Referring now to FIG. 1, a networked computer system in which an embodiment of the present invention is practiced is depicted in a block diagram. A server 20 includes a server processor SCPU coupled to a server memory SMEM that contains program instructions for implementing a portion of a system in accordance with an embodiment of the present invention and forming a computer-program product in accordance with another embodiment of the present invention. Server 20 is coupled to a number of workstation computers 10, which in the depicted embodiment each include a workstation processor CPU coupled to a workstation memory MEM that contains program instructions for implementing another portion of the system and forming a computer-program product in accordance with another embodiment of the present invention. Workstation computers 10 are also depicted as including a graphical display Display and input devices Input Devices, such as mice and keyboards, for interacting with a user interface as described in further detail below. Workstation computers 10 are coupled to server 20 over network, which may include wireless local area networks (WLANs), wired local-area networks (LANs), wide-area networks (WANs) or any other suitable wired or wireless interconnection that provides communication between server 20 and workstation computers 10. Further the present invention concerns widget object factories and widget functionality that is not limited to a specific computer system configuration or requiring a network at all, as some embodiments of the present invention are applicable to individual computer systems in which multiple users can access, and the network-informed embodiments of the present invention retain some functionality even in off-line configurations, such as when off-line voting is performed at a workstation 10 and then results provided during subsequent connection to server 20. Finally, the specification of a server 20 and workstations 10 and the location of their specific memories MEM and SMEM does not imply a specific client-server relationship or hierarchical organization, as the techniques of the present invention may be employed in distributed systems in which no particular machine is identified as a server, but at least one of the machines provides storage for voting results and one or more of the machines provides a source for generating instances of the widgets of the present invention.

Figure 2:
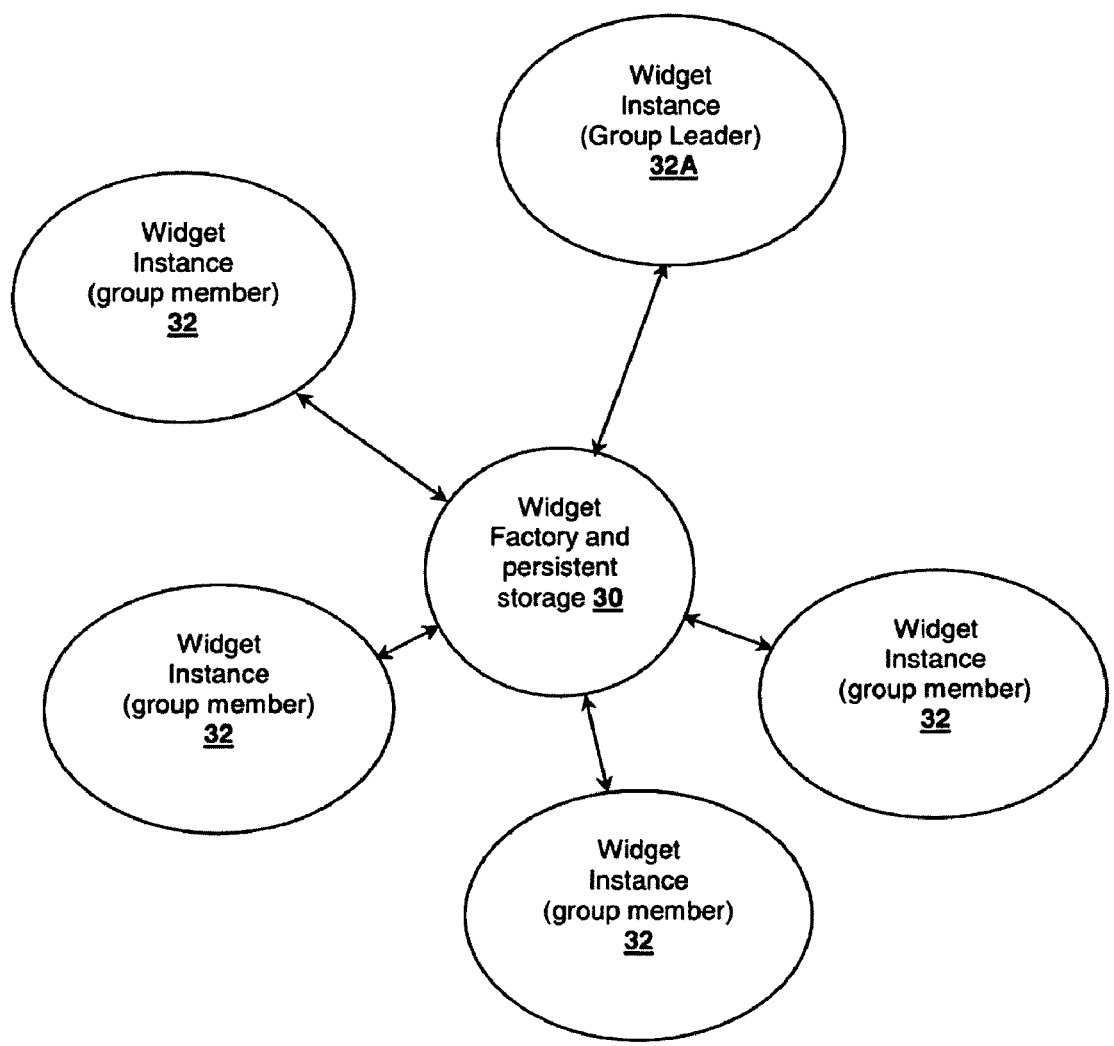
FIG. 2 is a pictorial diagram showing a widget relationship within the system of FIG. 1.

Referring now to FIG. 2, a pictorial diagram illustrating a relationship between widgets and other processes within the system of FIG. 1 is shown. A widget factory and persistent storage 30 are located in server 20 in the illustrative embodiment. Persistent storage 30 may be implemented as a file, separate object or another type of resource, or may be provided as data storage associated directly with program code that supplies widgets to workstations 10. Since widget instances 32 are generally implemented as remote objects, persistent storage 30 provides storage local to the server for vote tallies, and other information derived from or input to user interfaces provided by widget instances 32. While widget instances 32 are remote to server 20, they are local to workstations 10. Implementation of widget instances 32 remote from server 20 reduces the amount of bandwidth required to implement a control/widget interface oh workstations 10, and is the paradigm compatible with applications such as Internet browsers, for example, in which widgets are commonly implemented as JAVA objects. Widget instances 32 are generated at workstations 10 in sessions generated by ordinary group members and a special widget instance 32A, which may be a selectable operating mode of a common widget object, which has special control over a voting process otherwise controlled by widget instances 32.

Figure 3A:
FIGS. 3A-3B are pictorial diagrams depicting a widget control within a graphical user interface in accordance with an embodiment of the present invention.

Referring now to FIG. 3A, a widget 40 within a graphical user interface provided to an ordinary group member is shown. Widget 40 permits a user to make selections as part of the voting process, and may provide some indication as to how others have voted, as described in further detail below. However, widget 40 does not permit the user to alter the votes of others or intervene in the voting process, other than to make their own selections as a participant. The depicted widget includes a set of checkboxes 41 that are independently selectable, so that the user may vote on the inclusion of various features of a web page or social network interface that is being designed by the group. The depicted widget 40 is only one of many widgets that permit voting on various aspects of the design. Other widgets may specify the content of other pages, settings of characteristics of the site or page, such as colors, templates, shapes, and any variable types of content, look and feel. Other widgets may be of different control types, as well, and the checkboxes 41 illustrated are only one example of a control/widget type. User-input selecting or de-selecting checkboxes 41 effects a vote by the group member owning the instance of widget 40 and the result of the selection(s) is communicated to server 20 of FIG. 1, for accumulation of group voting results in persistent storage 30 of FIG. 1, since instances at workstations 10 generally do not have local persistence and the voting results are tallied to determine the final value of checkboxes 41, which is generally performed at server 20, but may be performed at another location. Checkboxes 42, for which results are already determined, for example, when a majority of a predetermined number of group members have voted for the value, are generally disabled. However, the final selection state may be shown, with the control grayed-out, for example. When multiple values are possible, a plurality of votes selecting the most-favored control value may be used to determine the final value. If and when a group leader calls for a re-vote, group members can be notified of the need to make new selections within widget 40 by a notification such as text item 43, alternatively, notification may be omitted, or indicated by color of checkboxes 42 or a frame around widget 40.

Figure 3B:
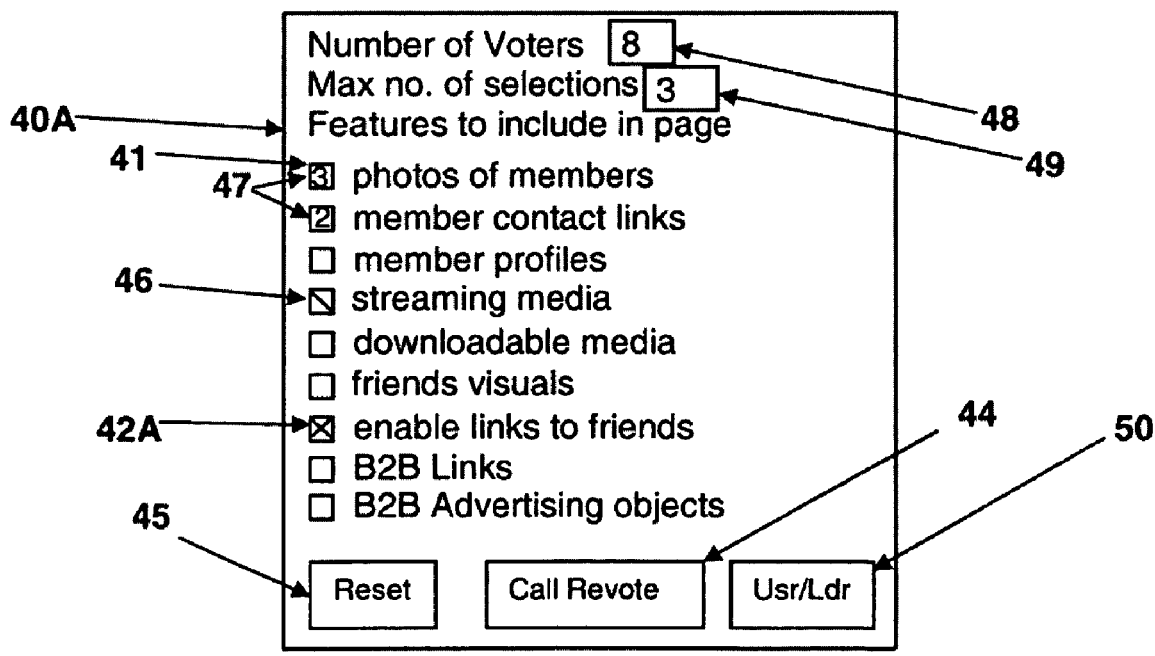

Referring how to FIG. 3B, a widget 40A within a graphical user interface that is provided to a group leader and having special features associated with the user's status as group leader is shown. The user of widget 40A, who has been identified as a group leader, is provided with special features that permit the group leader to set the parameters of the voting process, such as the number of permitted voters, and to intervene in the voting process by resetting, overruling and/of tie-breaking. The depicted widget includes a set of checkboxes 41 as in widget 40 of FIG. 3A, but additional features provided to the group leader are also present in association with checkboxes 41, as well as in other portions of widget 40A. For example, the number of votes from group member for the "checked" state of checkboxes 41 may be shown, to inform the group leader of the voting status, which are depicted as numbers 47 within checkboxes 41, but may alternatively be displayed in other locations. As another example, checkboxes 42A for which results are already determined, are not disabled in group leader widget 40A as they would be in group member widgets as described above with respect to group member voting and group member widgets 40 of FIG. 3A. Instead, the final selection state of checkboxes 42A is shown and checkboxes 42A remain operable as controls. The group leader may thereby overrule the group decision by un-checking checkbox 42A. When a tie between group members is present, for example when a predetermined number of users have voted and only half have selected checkbox 46, the tie may be indicated by color or other means such as the half-checked box shown in checkbox 46. The group leader can break the tie by selecting checkbox 46, or by selecting twice to de-select checkbox 46. Other controls that permit the group leader to alter the voting status are provided to the group leader. Button 45 permits the group leader to reset the voting status. Button 44 permits the group leader to call for a re-vote, and button 50 permits the group leader to select whether widget 40A operates in a group member or a leader mode. When widget 40A is selected for operating in group member mode, the features and functions of widget 40A displayed will generally be identical to those depicted in FIG. 3A, except for the persistent presence of button 50. Edit box 48 permits the group leader to set the number of participants voting, so that decisions such as fixing a control value after a majority vote is reached can be made. Edit box 49 allows the group leader to set the maximum number of selections provided in the final selection values for controls supporting multiple selections such as the illustrated set of checkboxes. If the number of selections is set by edit box 49 to less than the maximum number of options, then selections most preferred by the voting will be set as the final control value up to the maximum number of selections set in edit box 49. Any excess selections will remain unchecked/unselected. As an alternative to the group leader setting a predetermined number of voters as described above, an automatic determination of the number of voters may be used to determine the voting progress. For example, a predetermined membership list may provide the count, or for a contemporaneous-only session of multiple users, the number of widget instances may be used.

While the widgets displayed in FIGS. 3A-3B, provide specific examples of a multi-selection widget or control that includes features in accordance with embodiments of the present invention, the example of a set of checkboxes is only exemplary, as other types of widget controls in accordance with other embodiments of the present invention may be included within a design/control/specification interface. In general, controls that support only a single selection, such as single buttons or checkboxes, radio buttons and single-selection lists, do not require a setting for a "maximum number of selections" value. Other than the absence of a control for setting a maximum number of selections, the leader controls for reset, revote and number of voters remain the same. The techniques of the present invention can be applied to any type of selectable control, such as combo boxes, list controls, sliders, radio buttons, and multi-selection list boxes. As selections are made by group members, the selection information is sent to the persistent storage location, so that voting results can be tallied and the control values set to reflect the voting status.

Figure 4:
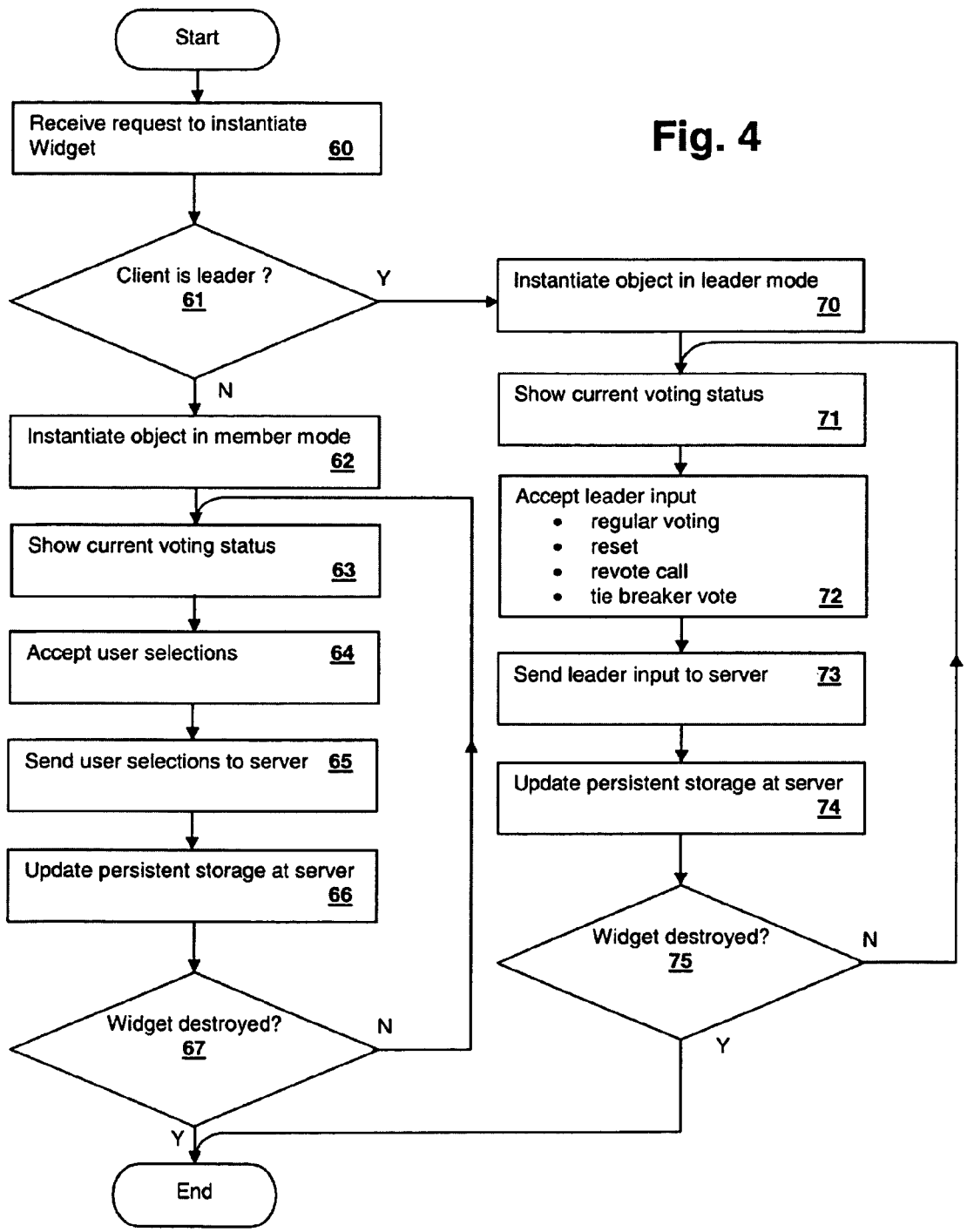
FIG. 4 is a flow chart of a widget method in accordance with an embodiment of the present invention.

Referring now to FIG. 4, a method in accordance with ah embodiment of the present invention is depicted in a flowchart. When a request to instantiate a widget is received (step 60), a determination is made as to of whether or not the client is a group leader (decisional), if the client is not a group leader, the widget is instantiated in member mode (step 62). The current voting status is reflected in the widget (step 63), e.g. by graying-out items for which values have been resolved, user selections are accepted (step 64), the user selections are sent to the server (step 65) and the persistent storage is updated at the server (step 66). Steps 64-66 are repeated until the widget is destroyed (decision 67), i.e., by calling the widget destructor, which is performed when a user has closed their widget, closed a browser hosting the widget, or otherwise indicates completion or abandonment of the user's participation in voting. If the client is a group leader (decision 61), the object is instantiated in leader mode (step 70) and the current voting status is displayed in the graphical user interface of the widget instance (step 71), e.g. by showing vote tallies, ties and resolved control values as illustrated in FIG. 3B and as described above. Leader input is accepted, including regular voting, resetting, re-vote calls, tie-breaking and other inputs setting parameters of the voting process as described above (step 72). The leader input is sent to the server (step 73) and persistent storage at the server is updated (step 74) and steps 71-74 are repeated until the widget is destroyed (decision 75).

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A computer-performed method for processing collaborative input from members of a group of users, wherein the method comprises:

determining whether or not a user for which a widget is to be generated is a group leader, wherein the widget instance has an associated voting status reflective of input from the members of the group of users, the associated voting status also including one of a resolved and an unresolved state;

within a computer system, displaying a user interface of the widget and setting a control value of the widget that controls an appearance of a feature of a user interface to indicate the associated voting status of a consensus of the members of the group of users with respect to their desired value of the appearance of the feature of the user interface, permitting adjustment of the control value by the user if the associated voting status is in the unresolved state, and prohibiting adjustment of the control value by the user if the associated voting status is in the resolved state, wherein the control value has a range of more than two distinct values; and responsive to determining that the user is a group leader, displaying the user interface of the widget within the computer system and setting a control value of the widget to indicate the associated voting status of the consensus of the members of the group of users with respect to their desired value of the appearance of the feature of the user interface, permitting adjustment of the control value of the widget by the user if the associated voting status is in the unresolved state, and further permitting the user to take further action to resolve or alter the associated voting status independent of whether or not the associated status is in the resolved or unresolved state.

2. The computer-performed method of claim 1, wherein the further action comprises providing a user input to override a current state of the associated voting status when the associated voting status is in the resolved state.

3. The computer-performed method of claim 1, wherein the further action comprises selecting a re-vote call, whereby subsequent instances of the widget presented to other members of the group provide an indication that the group leader has indicated that control value should be voted-on again.

4. The computer-performed method of claim 1, wherein the associated voting status is in an unresolved state due to a tie between a number of non-group-leader users, and wherein the further action comprises breaking the tie by setting a final value of the control value in conformity with the further action taken by the group leader.

5. The computer-performed method of claim 4, wherein the group leader is only permitted to set the control value if a current state of the associated voting status indicates a tie.

6. A computer system comprising a workstation processor for executing workstation program instructions and a memory coupled to the processor for storing the workstation program instructions, wherein the workstation program instructions for providing functionality of widgets in a graphical user interface presented on a display of the workstation computer system, wherein the workstation program instructions comprise program instructions for:
   determining whether or not a user for which a widget is to be generated is a group leader, wherein the widget instance has an associated voting status reflective of input from the members of the group of users, the associated voting status also including one of a resolved and an unresolved state;
   displaying a user interface of the widget and setting a control value of the widget that controls an appearance of a feature of a user interface to indicate the associated voting status of a consensus of the members of the group of users with respect to their desired value of the appearance of the feature of the user interface, permitting adjustment of the control value by the user if the associated voting status is in the unresolved state, and prohibiting adjustment of the control value by the user if the associated voting status is in the resolved state wherein the control value has a range of more than two distinct values; and
   responsive to determining that the user is a group leader, displaying the user interface of the widget within the computer system and setting a control value of the widget to indicate the associated voting status of the consensus of the members of the group of users with respect to their desired value of the appearance of the feature of the user interface, permitting adjustment of the control value of the widget by the user if the associated voting status is in the unresolved state, and further permitting the user to take further action to resolve or alter the associated voting status independent of whether or not the associated status is in the resolved or unresolved state.

7. The computer system of claim 6, wherein the further action comprises providing a user input to override the control value when the associated voting status is in the resolved state.

8. The computer system of claim 6, wherein the further action comprises selecting a revote call.

9. The computer system of claim 6, wherein the associated voting status is in an unresolved state due to a tie between a number of non-group-leader users, and wherein the further action comprises breaking the tie by setting a final value of the control value in conformity with the further action taken by the group leader.

10. The computer system of claim 9, wherein the group leader is only permitted to set the control value if a current state of the associated voting status indicates a tie.

11. A computer program product comprising computer-readable storage media encoding workstation program instructions for execution on a workstation computer system, wherein the workstation program instructions include workstation program instructions for providing functionality of widgets in a graphical user interface presented on a display of the workstation computer system, wherein the workstation program instructions comprise program instructions for:
   determining whether or not a user for which a widget is to be generated is a group leader, wherein the widget instance has an associated voting status reflective of input from the members of the group of users, the associated voting status also including one of a resolved and an unresolved state;
   within a computer system, displaying a user interface of the widget and setting a control value of the widget that controls an appearance of a feature of a user interface to indicate the associated voting status of a consensus of the members of the group of users with respect to their desired value of the appearance of the feature of the user interface, permitting adjustment of the control value by the user if the associated voting status is in the unresolved state, and prohibiting adjustment of the control value by the user if the associated voting status is in the resolved state wherein the control value has a range of more than two distinct values; and
   responsive to determining that the user is a group leader, displaying the user interface of the widget within the computer system and setting a control value of the widget to indicate the associated voting status of the consensus of the members of the group of users with respect to their desired value of the appearance of the feature of the user interface, permitting adjustment of the control value of the widget by the user if the associated voting status is in the unresolved state, and further permitting the user to take further action to resolve or alter the associated voting status independent of whether or not the associated status is in the resolved or unresolved state.

12. The computer program product of claim 11, wherein the further action comprises providing a user input to override the control value when the associated voting status is the resolved state.

13. The computer program product of claim 11, wherein the further action comprises selecting a revote call.

14. The computer program product of claim 11, wherein the associated voting status is in an unresolved state due to a tie between a number of non-group-leader users, and wherein the further action comprises breaking the tie by setting a final value of the control value in conformity with the further action taken by the group leader.

15. The computer program product of claim 14, wherein the group leader is only permitted to set the control value if a current state of the associated voting status indicates a tie.

16. A computer program product comprising computer-readable storage media encoding server program instructions for execution on a server computer system, wherein the server program instructions include server program instructions for providing widget objects to a workstation user interface, wherein the widget objects include program instructions for:
   determining whether or not a user for which a widget is to be generated is a group leader, wherein the widget instance has an associated voting status reflective of input from the members of the group of users, the associated voting status also including one of a resolved and an unresolved state;
   within a computer system, displaying a user interface of the widget and setting a control value of the widget that controls an appearance of a feature of a user interface to indicate the associated voting status of a consensus of the members of the group of users with respect to their desired value of the appearance of the feature of the user interface, permitting adjustment of the control value by the user if the associated voting status is in the unresolved state, and prohibiting adjustment of the control value by the user if the associated voting status is in the resolved state wherein the control value has a range of more than two distinct values; and responsive to determining that the user is a group leader, displaying the user interface of the widget within the computer system and setting a control value of the widget to indicate the associated voting status of the consensus of the members of the group of users with respect to their desired value of the appearance of the feature of the user interface, permitting adjustment of the control value of the widget by the user if the associated voting status is in the unresolved state, and further permitting the user to take further action to resolve or alter the associated voting status independent of whether or not the associated status is in the resolved or unresolved state.

17. The computer program product of claim 16, wherein the associated voting status is in the unresolved state due to a tie between a number of non-group-leader users, and wherein the further action comprises breaking the tie by setting a final value of the control value in conformity with the further action taken by the group leader.

* * * * *